United States Patent [19]

Dross

[11] Patent Number: 5,615,044

[45] Date of Patent: Mar. 25, 1997

[54] BINOCULAR TELESCOPE

[75] Inventor: Heinrich Dross, Ehringshausen-Daubhausen, Germany

[73] Assignee: Carl-Zeiss-Stiftung, Heidenheim, Germany

[21] Appl. No.: 289,866

[22] Filed: Aug. 12, 1994

[30] Foreign Application Priority Data

Aug. 28, 1993 [DE] Germany ............................ 43 29 049.3

[51] Int. Cl.⁶ .................................................. G02B 23/00
[52] U.S. Cl. ............................ 359/418; 359/414; 359/416
[58] Field of Search ....................................... 359/414, 416, 359/417, 418

[56] References Cited

U.S. PATENT DOCUMENTS

| 2,581,865 | 1/1952 | Kershaw et al. | 88/34 |
| 3,712,704 | 1/1973 | Sato | 359/416 |
| 4,630,901 | 12/1986 | Altenheiner et al. | 359/414 |
| 5,028,123 | 7/1991 | Watanabe | 350/556 |

FOREIGN PATENT DOCUMENTS

| 1203976 | 10/1965 | Germany . | |
| 2800667 | 5/1979 | Germany | 359/414 |
| 4124584 | 10/1992 | Germany | G02B 7/06 |
| 425267 | 5/1967 | Switzerland . | |
| 765272 | 1/1957 | United Kingdom . | |

*Primary Examiner*—Paul M. Dzierzynski
*Assistant Examiner*—Mohammad Y. Sikder

[57] ABSTRACT

A binocular telescope includes adjustable optical components. The telescope has at least two telescope halves, respectively having an optical axis passing through an ocular and an objective. The adjustable optical components lie between the ocular and objective in a respective housing tube. The telescope has, between the two telescope halves, an axis that is essentially aligned parallel to the two optical axes, and in which a shaft body is arranged. The shaft body has a longitudinal slot in which an adjusting body, displaceable in the longitudinal axis of the shaft body, is arranged. This adjusting body is adjustable in the longitudinal direction from outside the telescope, its axial movement being coupled with the movable optical components for common focusing. A separate drive knob is arranged to change the axial position of one optical component in one telescope half to compensate for visual defects.

9 Claims, 1 Drawing Sheet

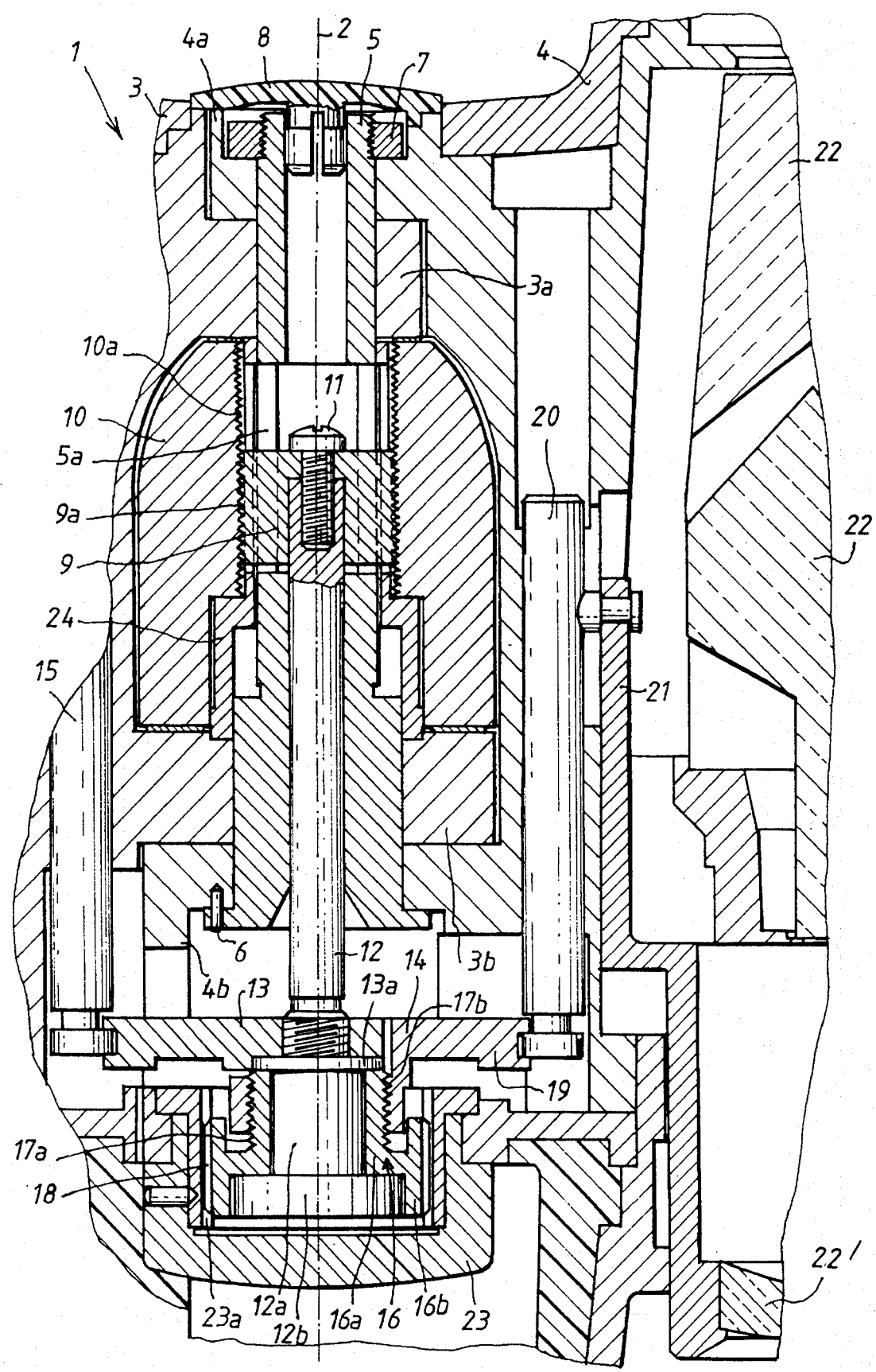

BINOCULAR TELESCOPE

BACKGROUND OF THE INVENTION

1. Field of the Invention

This invention relates to a binocular telescope having two telescope halves and a plurality of optical parts in each telescope half, including an ocular and an objective. At least one adjustable optical component is positioned between an ocular and an objective.

2. Relevant Prior Art

Binocular telescopes, containing at least one adjustable optical part, are well known in the art. The adjustment of the optical part serves, e.g., for compensation of visual defects, for fine adjustment, for changing the magnification, etc. As examples, the reader may refer to European Patentschrift 0,152,056 (corresponds to U.S. Pat. No. 4,630,901), German Patentschrift 2,316,955, and German Utility Models 7,435,008 and 1,843,837.

It is advantageous for the adjusting knob to be located in an ergonomically favorable position.

SUMMARY OF THE INVENTION

It is the object of this invention to provide a binocular telescope with a through shaft body, whereby the adjusting knob is arranged around the shaft body.

This object is achieved according to the invention by a binocular telescope comprising at least one adjustable optical component and at least two telescope halves. The two telescope halves each respectively have a plurality of optical parts. The optical parts include an ocular and an objective. The adjustable optical component is arranged between at least one ocular and at least one objective. At least one housing tube receives the optical parts, with an optical axis passing through a respective ocular and objective. A shaft body is arranged between the two telescope halves with a longitudinal axis aligned essentially parallel to the optical axes of the optical parts. The shaft body has a longitudinal slot and an adjusting body displaceable along the longitudinal axis of the shaft body. The adjusting body is arranged for movement in the longitudinal slot from outside the binocular telescope, and is coupled to at least one adjustable optical component in at least one telescope half.

The telescope according to the invention has a very compact construction in spite of very stable guidance of the two telescope halves by the through shaft body.

Since the adjusting mechanism is arranged in the shaft of the shaft body, an optimum distribution of weight is obtained.

A further advantage is the ergonomically favorable arrangement of the adjusting knob in the shaft body.

DESCRIPTION OF THE DRAWING

The invention is explained below with reference, by way of example, to the single FIGURE, and further important and inventive features are described.

DETAILED DESCRIPTION OF A PREFERRED EMBODIMENT

The region of a binocular telescope (1) shown in the FIGURE essentially shows, in section, the region around the hinge axis (2) and also portions of the housing (3, 4) of the two telescope halves.

A monolithic shaft body (5) is present in the hinge axis (2). This shaft body (5) is a round, longitudinal rod that is passed through the openings of one telescope half (4) in two lateral brackets (4a, 4b) and is firmly connected to this right-hand telescope half (4) by a pin (6) and a screw ring (7). The left-hand telescope half (3) is rotatably fastened to this shaft body (5) by two brackets (3a, 3b), with the round shaft body passing through corresponding openings of the corresponding bracket (3a, 3b). The shaft body (5) is closed by a removable cap (8) at one of its ends. The relative movement of the two telescope halves (3, 4) is thus defined by a single shaft body (5).

The round shaft body (5) has in the middle region an elongated opening (5a) in which a flat bridge adjusting body (9) is guided. This bridge body (9) has an external thread (9a) which engages an internal thread (10a) of a roller body (10) acting as a drive wheel. The roller body (10) is guided on the shaft body (5) by a guide element (24). By rotation of the roller body (10), the flat bridge body (9) is moved by means of the threads (10a, 9a) axially parallel to the optical axes and parallel to the hinge axis (2). The bridge body (9) is firmly connected by a screw (11) to a middle drive rod (12). One of the two driving disks or brackets (13, 14) is firmly connected to the middle drive rod (12). The middle driving disk (13), which is firmly connected to the middle drive rod (12), engages a first push rod (15), which transmits its movement to a mounting (not shown in the FIGURE; it is equivalent to what is shown on the other telescope half) with optical components (not shown in the FIGURE; they are equivalent to what is shown on the other telescope half). These optical components are thus driven in a motion in the optical axis of the further optical components belonging to this telescope half (3). The middle drive rod (12), in the extension behind the driving disk (13), is constructed as a thickened cylinder ring (12a), and ends in a cylindrical disk (12b) of further enlarged diameter, and is firmly connected to the cylindrical ring (12a).

A tubular ring (16) is mounted, freely rotatable, around and movable relative to the cylindrical ring (12a), and is mounted, axially fast, by the cylindrical disk (12b) and by the further cylindrical disk (13a) firmly connected to the driving disk (13).

This ring (16) consists of a tubular body (16a) arranged directly around the cylindrical ring (12a) and having an external thread (17a), and of an annular body (16b), which has an external toothing (18) and which is firmly connected to the tubular body (16a). The internal thread (17b) of a further driving disk or bracket (19) bears against the external thread (17a). This driving disk (19) engages, via a second push rod (20), a mounting (21) with optical components (22) in the telescope housing (4), and thus transmits its axial movement to these optical components (22), which are then moved in the optical axis of the additional optical components 22' (ocular, objective, etc.) belonging to this telescope half (4).

A drive knob (23) with internal toothing (23a) is arranged around the tubular ring (16). A rotation of this drive knob (23) is transmitted by the toothing (23a, 18) to the ring (16), which then turns with it. A rotation of the ring (16) leads, however, to a vertical movement of the driving disk (19) via the threads (17a, 17b), and thus to the movement of the push rod (20). The driving disk (13) with the push rod (15) belonging to it remains at the same time uninfluenced by this movement.

If, on the contrary, the middle drive rod (12) is moved axially, both driving disks (13, 19) then follow this movement, without the drive knob (23) being moved with it (because of the toothing (18, 23a)). The arrangement with this telescope (1) serves both for common focusing (by means of the roller body 10) and for the compensation of visual defects (by means of the drive knob (23)).

Other optical components in the telescope (1) can of course also be moved by the roller body (10), if it is desired, for example, to bring about a change of the magnification in both telescope halves. An additionally constructed further arrangement for focusing, either according to the invention or to the state of the art, then has to be used.

I claim:

1. A binocular telescope comprising:

at least one adjustable optical component and at least two telescope halves;

said at least two telescope halves each respectively comprising a plurality of optical parts;

said at least one adjustable optical component being arranged inside at least one of said two telescope halves;

at least one housing for receiving said optical parts of said at least two telescope halves;

a hollow shaft body arranged between said at least two telescope halves with a longitudinal axis aligned essentially parallel to said two telescope halves with said optical parts;

said hollow shaft body comprising a longitudinal slot;

a drive wheel arranged between two ends of said hollow shaft body around said longitudinal slot; and displacement means coupling said drive wheel and said at least one adjustable optical component;

said displacement means including an adjusting body arranged inside said longitudinal slot and displaceable along said longitudinal axis of said hollow shaft body by means of said drive wheel;

said displacement means further including a middle drive rod arranged on said longitudinal axis of said hollow shaft body and displaceable along said longitudinal axis of said hollow body by movement of said adjusting body;

said adjusting body being axially firmly connected to said middle drive rod inside said hollow shaft body;

said middle drive rod being coupled to said at least one adjustable optical component in at least one telescope half.

2. A binocular telescope according to claim 1, wherein said adjustable optical component comprises an optical component arranged for focusing.

3. A binocular telescope according to claim 1, wherein said adjustable optical component comprises an optical component arranged for compensation of visual defects.

4. A binocular telescope according to claim 1, wherein said hollow shaft body is arranged as a hinge shaft for said at least two telescope halves.

5. A binocular telescope according to claim 4, wherein said hollow shaft body comprises a round, longitudinal rod.

6. A binocular telescope according to claim 1, wherein said adjusting body has an external thread, said drive wheel being accessible from outside said binocular telescope for moving said adjusting body and having an internal thread in engagement with said external thread of said adjusting body.

7. A binocular telescope according to claim 6, wherein said drive wheel is arranged around said adjusting body.

8. A binocular telescope according to claim 1, further comprising a drive for driving said at least one optical component, connected to an inner body connected to said adjusting body, said inner body being connected, freely rotatable, to said adjusting body, said inner body having an external toothing, said drive having an internal toothing in engagement with said external toothing on said inner body, and a bracket connected to said inner body such that rotation of said drive changes an axial position of said at least one adjustable optical component in one of said two telescope halves.

9. A binocular telescope according to claim 8, wherein said inner body has a thread and said bracket has a thread in engagement with said thread of said inner body.

* * * * *